United States Patent
Willy et al.

[15] 3,688,162
[45] Aug. 29, 1972

[54] SEALED CASING FOR ELECTROLYTIC CAPACITOR WITH PRESSURE RELIEF VENT

[72] Inventors: John Robert Willy, Easley; Emil F. Blase, Pickens, both of S.C.

[73] Assignee: Sangamo Electric Company, Springfield, Ill.

[22] Filed: June 14, 1971

[21] Appl. No.: 152,820

[52] U.S. Cl..................................317/230, 317/242
[51] Int. Cl. ................................................H01g 9/12
[58] Field of Search......................317/230, 231, 233

[56] References Cited

UNITED STATES PATENTS

| | | |
|---|---|---|
| 2,178,686 | 11/1939 | Georgiev et al........317/230 X |
| 2,203,902 | 6/1940 | Georgiev...............317/230 X |
| 2,227,319 | 12/1940 | Pontis et al............317/230 X |
| 3,280,381 | 10/1966 | Ayer.........................317/230 |

*Primary Examiner*—James D. Kallam
*Attorney*—John A. Dienner et al.

[57] ABSTRACT

A pressure relief vent for electrolytic capacitors and the like in which an impervious thin metallic disc is supported by the capacitor casing between apertured vent retainer and sealing gasket members the aperture sizes of which are selected to effect rupture of the disc at a predetermined pressure differential across the disc.

11 Claims, 4 Drawing Figures

PATENTED AUG 29 1972 3,688,162
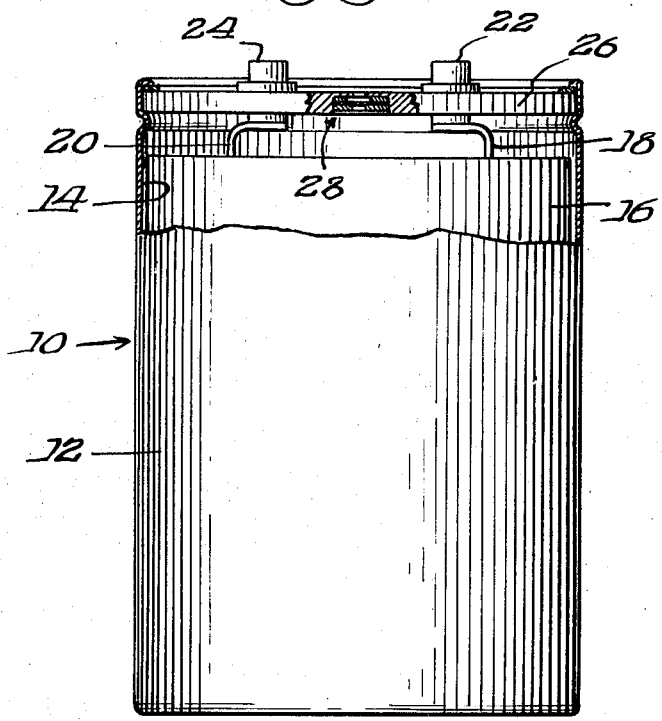
Fig. 1.
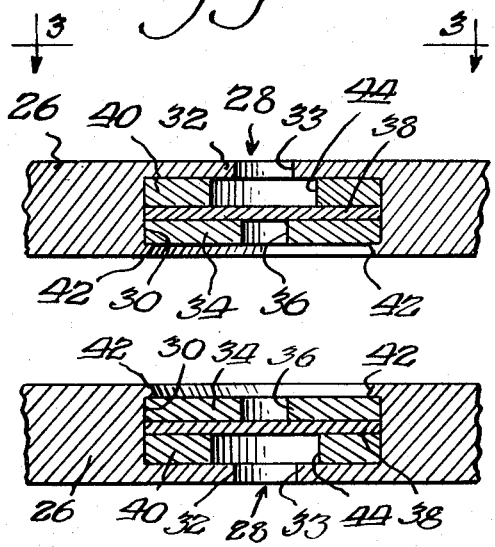
Fig. 2.
Fig. 4.
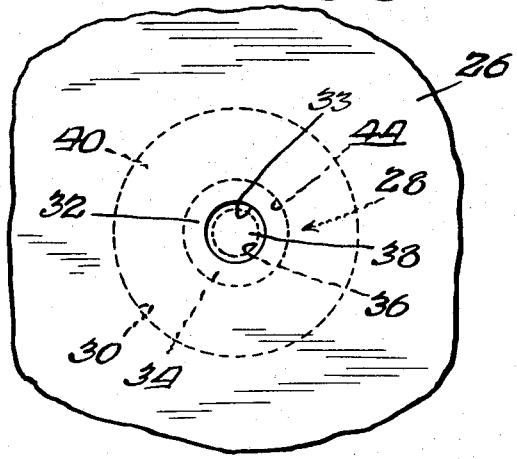
Fig. 3.
Inventors.
John Robert Willy, &
Emil F. Blase.
BY Johnson, Dienner, Emrich, Verbeck & Wagner Attys.

SEALED CASING FOR ELECTROLYTIC CAPACITOR WITH PRESSURE RELIEF VENT

BACKGROUND OF THE INVENTION

The present invention relates generally to electrolytic capacitors, and more particularly to a novel pressure release vent means therefor which is highly resistant to permeation by volatiles in the electrolyte and which functions as a safety pressure release vent upon malfunction of the associated capacitor.

A common problem with electrolytic capacitors lies in providing a reliable vent that will not leak gas or liquid at normal operating temperatures and pressures but which will function effectively as a safety pressure release vent when the capacitor malfunctions as the result of improper application, dielectric failure, or being connected in reverse voltage polarity. Typical pressure release vents as heretofore known and used are in the most part made of elastomeric materials that are not reliable because their operating characteristics change with heat, time, atmospheric conditions, and stresses due to pressure differentials. Recent developments in electrolytic capacitors have produced electrolytes which have extremely adverse effects on elastomer type pressure release vents. There thus exists a need for a pressure release vent which is highly resistant to permeation and deterioration by electrolyte volatiles and which will reliably release the internal pressure of an electrolytic capacitor or the like when the pressure reaches a predetermined value. The present invention meets such need and effectively overcomes the disadvantages found in the prior art pressure release vents.

SUMMARY OF THE INVENTION

In accordance with a preferred embodiment of the present invention, a capacitor having a casing open on one end is provided with an end plate sealingly fixed within the open end of the casing. The end plate has an opening therethrough communicating with the interior of the casing and supports pressure release means within the opening to release or vent internal pressure within the casing when the pressure reaches a predetermined dangerous magnitude. The pressure release means consists of a relatively thin metallic vent disc which is supported between an annular vent retainer member and an annular sealing gasket retained within the opening in the capacitor end plate such that one side of the vent disc is exposed to the atmosphere surrounding the capacitor and the other side of the vent is exposed to the interior of the capacitor. The vent retainer member and the gasket member have axially aligned apertures the sizes of which are selected to establish a pressure differential across the vent disc and effect rupture thereof when the internal pressure within the casing reaches a predetermined dangerous value. In one embodiment, the end plate of the casing in which the pressure release means is mounted has a portion substantially overlying the annular gasket and vent disc to prevent accidental puncturing of the disc during normal usage.

Accordingly, one of the primary objects of the present invention is to provide a novel pressure release vent for electrolytic capacitors and the like which will safely and reliably release pressure buildup within the capacitor casing when the pressure reaches a predetermined value, while providing a hermetic seal uneffected over normal operating temperature and pressure ranges.

Another object of the present invention is to provide a novel pressure release vent for electrolytic capacitors and the like which is resistant to permeation by volatiles contained in the electrolyte.

Yet another object of the present invention is to provide novel pressure release vent means for electrolytic capacitors and the like wherein the vent means consists of a thin metallic vent disc which is supported in sandwich fashion between apertured vent retainer and sealing gasket members, the vent disc being exposed to the interior of the capacitor casing and to the atmosphere surrounding the casing, and wherein the area ratio of the axially aligned openings in the retainer and gasket members is selected to effect rupture of the vent disc when a predetermined pressure differential across the disc is reached.

Further objects and advantages of the present invention, together with the organization and manner of operation thereof, may best be understood by reference to the following detailed description when taken in conjunction with the accompanying drawing wherein like reference numerals designate like parts throughout the several views.

BRIEF DESCRIPTION OF THE DRAWINGS

FIG. 1 is a side elevational view of an electrolytic capacitor employing a pressure release vent in accordance with the present invention, a portion of the casing being broken away to better illustrate the invention;

FIG. 2 is an enlarged partial sectional view of the pressure release vent mounted in the upper end cover of the capacitor casing;

FIG. 3 is a partial plan view taken generally along the line 3—3 of FIG. 2, looking in the direction of the arrows; and FIG. 4 is an enlarged partial sectional view of an alternative mounting arrangement for the pressure release vent.

DESCRIPTION OF A PREFERRED EMBODIMENT

Referring now to the drawings, and in particular to FIG. 1, the present invention will be described, by way of illustration, in conjunction with an electrolytic capacitor indicated generally at 10. The capacitor 10 includes a hollow cylindrical casing means 12 which defines a substantially closed cylindrical chamber 14 therein which is open at the upper end thereof prior to assembly of the capacitor components. The casing 12 is made of a suitable chemical electrolyte resisting material and serves to encase a capacitor section 16 of conventional design and an electrolyte which surrounds the capacitor section 16 within the casing in a known manner. The capacitor section 16 has electrodes 18 and 20 projecting from the upper end thereof, the electrodes being connected to suitable connector terminals 22 and 24, respectively. The conductor terminals 22 and 24 are mounted in a top or upper end cover plate 26 which is sealingly secured within the casing 12 adjacent the upper open end thereof. The end cover plate 26 will be considered as a portion of the capacitor casing means and is similarly made of a suitable material resistant to the electrolyte, with the connector terminals 22 and 24 being suitably electrically insulated from the end plate.

The electrolytic capacitor 10 thus far described is of generally known construction. It is known in the operation of electrolytic capacitors that a liquid or gas pressure buildup may result interiorly of the casing thereof when the capacitor malfunctions as the result of improper application, dielectric failure, or being connected in reverse voltage polarity. The present invention is concerned primarily with the provision of pressure sensitive release vent means for use in conjunction with an electrolytic capacitor or the like, which vent means will not leak gas or electrolyte fluid at normal operating temperatures and pressures but will function as a safety pressure release vent when the capacitor malfunctions.

To the above end, I provide pressure sensitive release vent means, indicated generally at 28, which is mounted in the top cover or end plate 26. NOTING FIG. 1, taken in conjunction with FIGS. 2 and 3, the pressure sensitive release vent means 28 is mounted within a circular recess 30 formed in the lower surface of the end plate 26. The circular recess 30 is of limited depth so as to establish an upper wall portion 32 in the end plate which has an opening 33 therein axially aligned with the circular recess 30. The pressure sensitive release vent means 28 includes an annular vent retainer member 34 which is preferably made of a metallic material compatable with the chosen electrolyte to be used within the capacitor 10. The vent retainer member 34 has an outer diameter which allows snug insertion into the recess 30 and includes an axially disposed circular aperture 36 therethrough of a predetermined size as will be more fully explained hereinbelow. A relatively thin flat metallic vent disc 38 having an outer diameter substantially identical to that of the vent retainer member 34 is supported directly on the upper surface of the vent retainer member, considered in FIG. 2, so as to overlie the central aperture 36 in the vent retainer member. Preferably, the thin vent disc 38 consists of an aluminum disc of sufficient thickness to resist permeation by the volatiles contained within any electrolyte as might be used with the capacitor 10.

An annular sealing gasket 40 is disposed within the recess 30 between the wall portion 32 of the end plate 26 and the vent disc 38, and serves to hermetically seal the vent disc within the recess 30 of the end plate 26. In assembly, the annular seal 409 vent disc 38 and annular vent retainer member 34 are assembled in stacked relation and inserted within the recess 30 in the end plate 26, the end plate being thereafter swaged or staked over as at 42, either at intervals about the edge of the recess 30 or in a manner to provide an annular swaged retainer ridge. The vertical thicknesses of the vent retainer member 34, the vent disc 38 and the annular sealing gasket 40, as well as the depth of the circular recess 30, are selected such that the pressure sensitive release vent means 28 is fixedly secured and sealed within the recess 30 of the end plate 26.

The annular gasket 40 has an axially disposed circular aperture 44 therethrough which is axially aligned with the aperture 36 in the vent retainer member 34, the axially aligned apertures of the retainer member and gasket being separated by the vent disc 38. In this manner, the vent disc 38 has its lower inner surface directly exposed to the interior of the capacitor 10 and has its upper outer surface exposed to the atmosphere surrounding the capacitor through the circular opening 33. The relative effective circular cross-sectional area of the aperture 44 which is exposed to the vent disc 38 is selected to establish a pressure differential acting across the vent disc 38. The wall portion 32 of the end cover 26 adjacent opening 33 partially overlies the sealing gasket 40 and a portion of the vent disc 38 to prevent accidental puncturing of the vent disc which, as noted, is exposed to atmosphere through the opening 33.

During operation, if the pressure within the capacitor casing 12 should reach a predetermined value which is determined to be unsafe, the pressure differential acting across the vent disc 36 will cause the vent disc to rupture allowing release of the excess pressure within the casing 12 to the atmosphere surrounding the capacitor. The specific properties and dimensional configurations of the elements comprising the pressure sensitive release vent means 28 may vary depending upon the specific application. In particular, the specific physical characteristics of the thin metal vent disc 38 are selected such that in combination with the area of the aperture 44, the vent disc will rupture when interior pressure within the casing 12 of the capacitor reaches a predetermined pressure relative to the pressure of the atmosphere surrounding the casing and acting on the upper surface of the disc vent through the opening 33 in the upper end cover 26.

One design which has been found to be particularly useful in electrolytic capacitors, provides an aluminum vent disc 38 which has a thickness to resist permeation of the volatiles in the electrolyte and which is designed to rupture at a pressure differential between the inside of the casing 12 and the outer atmosphere thereof of approximately between 100 and 140 PSI. This rupture pressure may be changed by using different vent materials, different thicknesses of the same material, and different temper or strength characteristics of the same material. In addition, the rupture pressure may be varied by differing the effective diameter of the axial opening 44 within the seal gasket 40. One particular embodiment of the present invention employed an aluminum vent disc made of 99.99 percent pure aluminum having an "O" temper and having an effective opening 44 diameter of 0.200 inches and a thickness of 0.0015 inch.

While one embodiment of my invention has been shown and described with reference to FIGS. 1–3, it will be obvious to those skilled in the art that changes and modifications may be made therein without departing from the invention in its broader aspects. For example, FIG. 4 illustrates an alternative pressure release vent mounting arrangement wherein the recess 30 is formed in the upper surface of the end plate 26. The annular gasket 40 is then placed in the bottom of the recess 30 with vent disc 38 placed on top of the gasket 40 and the vent retainer member 34 placed on top of the vent disc 38. The vent retainer may be secured in position by swaging or by any one of several known spring type retainer methods.

We claim:

1. A closed casing having a header and an interior chamber for containing a material productive of variable pressures therein, pressure release means comprising an aperture in said header communicating with said interior chamber of the casing, and vent means in said aperture, said vent means being secured to said header and hermetically sealing said aperture and comprising a relatively thin metallic member blocking said aperture with at least a portion of one side thereof exposed directly to said interior chamber of the casing and at least a portion of the opposite side exposed to the atmosphere external to said chamber in said casing, and washer-shaped members secured to said header to seal said metallic member with respect to said aperture and having the openings thereof in registration with said aperture upon greater pressure within said chamber causing the rupture of said sealed metallic member to release the pressure through said openings and said aperture.

2. An improvement of claim 1 wherein said relatively thin metallic member is made of aluminum material.

3. The improvement of claim 1 wherein one of said washer-shaped members comprises sealing gasket material for establishing the hermetic seal between said thin metallic member and the header.

4. The improvement of claim 1 wherein said aperture includes a circular opening in said header and wherein one of said washer-shaped members comprises a metal washer and a second one of said washer-shaped members is of an elastomer material, and in which said thin metallic member is located between said first and second washer-shaped members, the second one of said washer members being in direct engagement with the upper surface of said header and having a central opening in alignment with said circular opening.

5. An improvement of claim 4 wherein said thin metallic member comprises a thin aluminum disc and said openings of said washer-shaped members are in registration with said aperture in said header whenever said aluminum disc ruptures in response to the interior pressure within the casing reaching a predetermined value relative to the atmospheric pressure surrounding the casing.

6. A closed casing having a header and an interior chamber for containing material productive of variable pressure therein, pressure release means comprising an aperture in said header communicating with said interior chamber of the casing and vent means in said aperture, said vent means being secured to said header and hermetically sealing said aperture and comprising a relatively thin metallic member blocking said aperture with at least a portion of one side thereof exposed directly to said interior chamber of the casing and at least a portion of the opposite side exposed to the atmosphere external to said chamber in said casing, at least first and second washer-shaped members, and means for securing said washer-shaped members within said aperture with said metallic member disposed between the washer-shaped members, one of said washer-shaped members being of an elastomer material providing gas and liquid-tight seal between said washer members and said header, said washer-shaped members having openings in registration with said aperture upon greater pressure within said chamber causing the rupture of said sealed metallic member to release the pressure through said openings and said aperture.

7. The combination of claim 6 wherein said metallic member consists of an aluminum disc.

8. The combination of claim 6 wherein said metallic member comprises a thin metallic disc.

9. A combination of claim 6 wherein said aperture includes a first circular recess of a first diameter in said header which connects with said interior chamber and a second circular recess of a different diameter which connects with the atmosphere.

10. The combination of claim 9 in which the diameter of the second circular recess is smaller than the diameter of the first circular recess.

11. The combination of claim 9, wherein said first and second washer-shaped members and said metallic member are snugly fit in the larger of said first and second circular recesses and wherein said securing means comprises swaging the end of said larger recess which is opposite to the smaller of said first and second circular recesses.

* * * * *